(12) United States Patent
Jäckel et al.

(10) Patent No.: US 6,401,897 B1
(45) Date of Patent: Jun. 11, 2002

(54) DEVICE FOR TRANSMITTING TORQUE

(75) Inventors: Johann Jäckel, Baden-Baden; Stefan Bornefeld, Bühl, both of (DE)

(73) Assignee: Luk Lamellen und Kupplungsbau GmbH, Buhl (DE)

(*) Notice: Subject to any disclaimer, the term of this patent is extended or adjusted under 35 U.S.C. 154(b) by 0 days.

(21) Appl. No.: 09/526,396

(22) Filed: Mar. 16, 2000

(30) Foreign Application Priority Data

Mar. 16, 1999 (DE) .......................................... 199 11 666

(51) Int. Cl.[7] .............................................. F16D 13/60
(52) U.S. Cl. ................. 192/70.13; 192/55.61; 192/70.17; 192/DIG. 1
(58) Field of Search ........................... 192/70.13, 70.16, 192/70.17, 70.27, 55.61, DIG. 1

(56) References Cited

U.S. PATENT DOCUMENTS

| | | | | |
|---|---|---|---|---|
| 5,367,921 A | * | 11/1994 | Fukushima | .......... 192/70.13 X |
| 5,645,151 A | * | 7/1997 | Lindner et al. | .......... 192/70.17 |
| 5,680,918 A | * | 10/1997 | Reik et al. | .......... 192/55.61 X |
| 5,823,312 A | | 10/1998 | Reik et al. | |
| 5,853,075 A | * | 12/1998 | Giroire | .......... 192/70.16 |
| 5,901,825 A | * | 5/1999 | Uenohara | .......... 192/70.13 |
| 5,988,338 A | | 11/1999 | Maucher | |
| 6,098,772 A | | 8/2000 | Kimmig et al. | |

FOREIGN PATENT DOCUMENTS

DE          44 28 829 C 2          11/1986

* cited by examiner

*Primary Examiner*—Richard M. Lorence
(74) *Attorney, Agent, or Firm*—Darby & Darby (57) ABSTRACT

The invention relates to a device for transmitting torque, more particularly from an internal combustion engine to a transmission on the output side in a motor vehicle, and to a method for assembling and dismantling as well as maintaining this device.

91 Claims, 6 Drawing Sheets

DEVICE FOR TRANSMITTING TORQUE

The invention relates to a device for transmitting torque having at least one disc part fixed directly or indirectly to a crankshaft of an internal combustion engine, and a clutch formed as a structural unit wherein the disc part with the clutch as the structural unit can be fitted on the crankshaft and the structural unit of the clutch can be separated from the disc part for maintenance purposes, and also relates to a method for assembly and maintenance.

A torque transmission device of this kind, described for example in DE PS 44 28 829, can be fitted complete on the crankshaft and has a clutch unit which is connectable to a secondary flywheel mass of a divided flywheel so that for maintenance purposes the divided flywheel can remain on the crankshaft and only the structural unit of the clutch has to be removed.

Dismantling the clutch unit is difficult insofar as for release, screws or rivets fitted from the engine side from outside into the secondary part also have to be removed from the engine side whereby tools have to be inserted in the often very restricted interspace between the engine housing and flywheel and have to be guided in the axial direction through openings in the first flywheel mass part up to the connecting means in order to release individually the numerous connecting means which are spread out round the circumference, resulting in a considerable maintenance expense. In many cases where this interspace is not accessible for the tools this device cannot be used.

The object of the invention is therefore to provide a device for transmitting torque and a corresponding method wherein the worn out parts can be quickly and easily replaced. Furthermore the device is to be capable of use in a wide number of applications and is thus to be more cost-effective since it can be produced in increased numbers. A method for the assembly and maintenance of the device is to be carried out with few steps and using simple tools whereby the clutch can be interchangeable in modular fashion and when required can be replaced by a new clutch module without additional adjustment work.

This is achieved through a device for transmitting torque, more particularly for motor vehicles which has at least one first disc part fixed directly or indirectly on a crankshaft of an internal combustion engine, to which (disc part) a friction clutch is connected which consists as a separate component part of at least a contact pressure plate, a clutch cover which holds axially displaceable and rotationally secured a pressure plate and engages radially round same, and a clutch disc which is mounted axially between the contact pressure plate and the pressure plate and which is fitted with friction linings provided radially on the outside which can be brought into friction engagement with the pressure plate and contact pressure plate by means of at least one energy accumulator acting axially between the pressure plate and clutch cover, and is connectable rotationally secured to a gear input shaft of a transmission on the output side in the force flow, wherein the device can be fitted as a complete unit on the crankshaft and the friction clutch is connected to the disc part by means of fixing means which can be separated from the transmission side.

A friction clutch, for example prefabricated as a module, can be connected to the disc part by means of screws, rivets and/or other fixing means, but a fixing is particularly advantageous having self-locking fixing means so that the clutch during the initial assembly as well as after servicing can be pressed for fixing onto the disc part without the need for tools. Dismantling the clutch is thereby carried out from the transmission side, after the gearbox has been separated from the engine housing, or at least the gear input shaft has been removed from the hub of the clutch disc so that after loosening the connection to the disc part the clutch can be removed. To this end for separating the fixing means the required tools are guided through corresponding recesses in the plate spring tongues which can also serve for fixing the device on the crankshaft and vice versa. It can thereby be particularly advantageous to provide the fixing means or the connection between the disc part and clutch in the radial area of the mountings of the device on the crankshaft, for example radially outside or radially inside same. It is also possible according to the inventive idea to arrange the fixing means directly at the radial height of the hub of the clutch disc so that the tools required for separating the fixing means are guided through corresponding recesses in the hub or through the opening for mounting the gear shaft.

It can thereby be advantageous to use a push-fit connection whereby the two parts are pushed into each other and fixed axially and circumferentially on each other, with at least one or more for example several, circumferentially spaced out push-fit connections forming the connection with the disc part. In the simplest case a push fit connection of this kind can be formed from an axially raised extension arm which is pushed into a corresponding recess of the complementary component part and is held there, for example by means of a fixing screw. It can be particularly advantageous to form the push-fit connection as an axially locking or better still an automatically axially locking snap-fit connection which can be designed so that it can be released in one step.

An advantageous development of a device according to the invention provides axial extension arms of the friction clutch on a second disc part which takes up the contact pressure plate and which is fixedly connected to the clutch cover along its outer circumference. In this way a module can be formed from the clutch which can be removed completely and closed per se from the first disc part through separating the connection at the axial extension arms.

It has proved advantageous to arrange several, for example two to ten, preferably three to six, axial extension arms or mounting points over the circumference of the disc part wherein these are fixedly connected to the same number of axial extension arms of the other disc part or to another component part of the clutch.

In order to form a cost-effective and automatically engaging mechanism, assemblies have also proved advantageous where snap-fit noses are provided on a component part forming the connection to snap-fit in complementary openings of the complementary component part which forms the connection. The snap-fitting noses can thereby be arranged so that all the snap-fitting noses are arranged on one component part, for example on the mountings on the clutch side, or on both mountings—alternately on the clutch side and engine side, preferably round the circumference. The alignment of the snap-fitting noses can be in any direction wherein an alignment radially outwards has proved advantageous wherein the snap-fitting noses engage in corresponding openings of the complementary component part. In many cases and embodiments it can be advantageous or even a requirement if the disc part fixed on the crankshaft, and the clutch for example are indeed fixed axially through the second disc part which is connected to the clutch cover and engages round the contact pressure plate, but rotatable in the circumferential direction at least over a restricted angular area.

To this end the fastening means, for example circumferentially spaced out extension arms with snap noses, of the one side to be connected can be mounted on a common ring, which can have complementary openings for engaging the snap-fitting noses, of the other side, which is mounted axially fixed and rotatable on one of the two disc parts. In this way the fastening means of the one component part form with the other component part an axially fixed but rotatable connection which can be separated accessible from the gearbox side.

An advantageous development provides a ring which is mounted axially between a disc part, for example the disc part on the clutch side receiving the contact pressure plate, and a component part connected to this disc part and radially overlapping the ring. This component part can have mutually corresponding recesses for the fastening means, for example the snap-fitting noses engaged in the ring, in the region of the proposed relative rotation of the two disc parts. Furthermore the ring can be tensioned axially between this component part and the disc part by means of an axially active energy accumulator so that during relative rotation of the two disc parts opposite one another through the separable connection of the ring relative to the disc part receiving same likewise takes place with the generation of a friction torque which is fixed for example when using a plate spring as the axial energy accumulator inter alia by its spring constant.

According to an inventive idea the disc part which is mounted on the crankshaft can be formed axially flexible in order to dampen any noises which may arise resulting from the bending vibrations of the crankshaft which can be transferred through the disc part to the drive train.

A further inventive idea proposes the two disc parts rotating circumferentially relative to each other against the action of a damping device having at least one energy accumulator, that is the disc part fixed on the crankshaft is rotatable against the disc part receiving the contact pressure plate preferably over a restricted angular area. The separable connection between the clutch and the disc part on the drive side is produced for example through the snap-fitting connection described above wherein a part of the snap-fitting connection with one disc part is rotatable at least over a restricted angular area opposite the disc part which holds it axially and/or radially fixed, whereby this snap-fitting connection can also provide the bearing of the two parts on each other.

The damping device consisting of at least one circumferentially compressible energy accumulator, for example in the form of at least one coil compression spring which is short compared to the circumference, wherein the ratio between the extension of the at least one energy accumulator and the circumference can be less than 0.5, preferably less than 0.25, or at least a coil compression spring which is long but pre-curved to the installation state, can advantageously be housed in a manner known per se in a chamber formed by a disc part and having corresponding means so that it can be circumferentially biased by the two disc parts. It can be particularly advantageous if the energy accumulator is mounted in a spring cage forming the mounting, which is described in the application DE 198 43 298 and whose contents are to be fully included in the present application, by means of which the at least one energy accumulator can be biased on the drive side and output side. The mounting of two to eight, preferably by four to six, short coil springs acting as energy accumulators can advantageously be in the mounting device and can be installed pretensioned at least on account of the secured fitting and/or can be operated without the addition of lubricants.

It is evident that sets of energy accumulators of this kind need not be restricted to one circumference, but further energy accumulators having the same or different spring rate can be arranged acting between the two disc parts on at least a further radially inner and/or radially outer circumference.

The energy accumulators can advantageously be mounted in the cage-like component part so that one damping module with prefitted energy accumulators is produced which can be installed complete in the device. It can thereby be advantageous to fix the spring cage secured against loss on one of the two disc parts, for example by means of a self-locking device or a snap-fitting connection wherein it can be further advantageous to mount the spring cage on the biasing devices of the disc part. In many cases it can thereby be advantageous to fix the spring cage on the disc part on the drive side and to leave it there when separating the clutch from the disc part on the drive side whereby the clutch module to be exchanged is simpler, lighter and more cost-effective whilst in other cases, particularly when a large amount of wear is expected on the damping device, the spring cage can be fixed on the disc part of the clutch module and can be removed and serviced with the clutch module.

In one proposed embodiment for fixing the spring cage on the disc part on the drive side the fixing means are mounted on the screws for fixing the unit on the crankshaft and have tabs which engage axially round the cage-like component and engage radially in corresponding recesses in the cage-like component part.

In one embodiment for mounting the spring cage on the disc part on the clutch side holding the contact pressure plate, fixing is by means of tabs which are connected to the disc part on the clutch side and engage axially round the cage-like component part and lock radially with corresponding mouldings provided on the side remote from the disc part. The tabs can additionally undertake to bias the energy accumulators on the clutch side.

Where applicable to improve the efficiency of the damping device a friction device can be connected in with the energy accumulators where it acts in the force flow between the disc parts at least over a part of the rotational path of the disc parts opposite one another, the friction device comprising a basic friction which acts continuously during relative rotation of the disc parts, and a friction which is controlled in dependence on the torsional angle.

The basic friction can hereby be produced by a friction disc which is tensioned in the region of the mutual bearing of the two disc parts axially between the two disc parts or between one disc part and a bearing bush which is connected rotationally secured to the other disc part. The axial tension which is required for this purpose can be produced for example by means of the fixing means between the two disc parts, that is through the fixing means of the separable connection between the clutch and the disc part on the drive side.

A further advantageous embodiment proposes a basic friction between the ring which is rotatable opposite the disc part holding same at least in the work area of the damping device for holding the fixing means, and the disc part holding he ring, wherein the ring and disc part can be spaced from each other by means of an axially acting energy accumulator.

Furthermore the basic friction can be produced by means of two biasing devices which are in axial friction engagement, for example two mutually rotatable axially adjoining mounting rings for mounting the energy accumulators of the cage-like component part wherein the biasing devices each adjoin a disc part by their side remote from the friction surface and are thus each tensioned relative to each other by the axially restricted axial connection between the two disc parts.

The controlled friction can thereby take place in that a friction disc engages with keyed connection, more advantageously with backlash, in one of the disc parts and is in direct or indirect friction engagement with the other disc part. The keyed connection can thereby be formed by a spline between the friction disc forming friction engagement with the one disc part, and the other disc part wherein the friction disc can be mounted axially between the two disc parts and for example on the disc part on the crankshaft side.

According to a particularly advantageous further development of the friction control device the friction disc or individual, for example 3 to 9 circumferentially spaced out friction segments are provided on the side of a disc part remote from the damping device, for example on the disc part on the drive side. For this purpose the friction disc can be hung secured against loss by means of axially aligned studs in openings provided in the disc part and running as oblong holes in the circumferential direction, and can be tensioned with the disc part by means of an axially active energy accumulator. The energy accumulator which is advantageously likewise mounted on the outer side of the disc part can in a further advantageous embodiment bias the friction disc from radially outside, whereby it can be supported on a projection of the disc part radially engaging over same or on a component part provided to form a projection of this kind, and can be formed from a plate spring or diaphragm spring. It is obvious that the friction control disc when biased with the axially active energy accumulator can be expanded radially by the studs in order to stabilise the friction control disc in the region of the oblong holes and that in principle an arrangement of this kind can also be advantageous axially between the two disc parts, whereby the axially active energy accumulator can be used on both sides for example as a tensile or compression spring. Furthermore it can be advantageous if the energy accumulator and/or the projection covers the friction control disc so that the latter cannot be contaminated, for example radially from outside.

In one embodiment the component part forming the projection can be formed from a radially inwardly expanded sheet metal folded part which is connected to the disc part and is provided for mounting or forming the starting gear ring which is mounted in the region of the outer circumference of the torque transmission device wherein this folded sheet metal part can additionally contribute to the inertia moment of the disc part on the drive side as a flywheel mass.

The control of the friction control disc lying on the outside is advantageously achieved by providing openings in the studs of the friction control disc through which axially aligned extension arms of the other disc part or of the component part connected thereto can engage with rotational locking and in the proposed friction angular region predetermined by the extension of the oblong hole openings in the circumferential direction turn the friction disc relatively against the one disc part generating a friction moment. It is evident that in many cases the arrangement of a friction disc of this kind can be the disc part on the clutch side and the friction disc can be arranged anywhere over the radius of the device, preferably radially outside, for example for producing longer friction paths, of the damping device, for example radially outside of the spring cage.

In order to achieve a flywheel effect it can be of particular advantage to equip at least one and preferably both disc parts—drive side and/or clutch side disc part holding the contact pressure plate, with a flywheel mass. When equipping both disc parts with a flywheel mass which cannot be disregarded in respect of its inertia mass, the positive effect of a divided flywheel known per se can be achieved.

It is thereby advantageous to form the primary, i.e. drive-side, flywheel mass from the disc part and/or additional material accumulations lying preferably radially on the outside, such as folded sheet metal parts. Flywheel masses of this kind can be formed from one or more folding processes of the corresponding parts wherein these parts can have additionally formed mountings for a starting gear ring and/or markings for the engine management system such as ignition marks, or can form these themselves.

Thus in an advantageous development a folded sheet metal part can be placed on the disc part and both can be shaped radially outwards into a radial flange which has on its outer circumference a spline which is advantageously at least partially hardened, for engagement with the starting motor.

The clutch-side secondary flywheel mass is formed substantially by the parts, such as the contact pressure plate and/or pressure plate as well as clutch cover, forming the friction engagement with the clutch disc wherein the disc part on the clutch side and the clutch disc can make a positive contribution to the inertia moment.

Furthermore according to the idea of the invention it can be advantageous to provide at least on one, preferably on the clutch-side, disc part between the disc part and the flywheel mass a friction clutch which can be restricted in its torsional travel. It can thereby be further advantageous to design the breakaway torque of the friction clutch so that the transferable torque of the friction clutch is less than the maximum torque of the internal combustion engine but greater than the average torque so that torque peaks, for example during the start-up of the internal combustion engine are transferred to the gearbox at least to a reduced extent through the friction moment of the friction clutch. In order to prevent a complete slipping through of the friction clutch, for example in the event of overheated friction linings, the clutch preferably has a restricted rotation capacity so that after a predetermined torsional angle the two relatively rotatable parts are restricted by stops.

An advantageous embodiment has for this purpose a friction clutch on a disc part designed in two parts on the clutch side wherein a flange part forming the bearing for the drive-side disc part is rotatable a restricted amount opposite a flange part holding the clutch with the interposition of the friction clutch where applicable by means of axial stops of the first flange part which engage in recesses of the second flange part corresponding to the torsional angle.

A torque transmission device according to the invention, formed as a divided flywheel with a primary and a secondary disc part provides for the bearing of the two parts on each other a slide bearing, advantageously with the interposition of a slide bearing bush, or a bearing through rolling bearings wherein the slide bearing with a corresponding design, for example with the design of the slide bearing bush with a radial collar which is mounted axially with pretension between the two bearings, can function as a friction device for creating a basic friction.

It can furthermore be advantageous to centre and support the torque transmission device on the crankshaft wherein the disc part on the primary side can be mounted directly on the crankshaft and the second disc part can be mounted on the primary disc part or a bearing flange can be fitted fixed on the crankshaft wherein the bearing for the bearing flange and the rotatable bearing of the second disc part are on different diameters and the primary-side disc part is connected fixedly to the bearing flange. Furthermore one embodiment can be advantageous wherein the bearing of the two disc parts on each other is undertaken by the separable connection—or viewed from another angle—the common bearing of the disc parts additionally forms the separable connection, for example through the integration of a self-locking device.

Furthermore depending on the type of use it can be advantageous to mount the clutch-side disc part on an outer circumference of the drive-side disc part or bearing flange or to mount the primary disc part or the bearing flange on an outer circumference of the clutch-side disc part. Furthermore from experience of the wear properties of the slide bearing bush the latter can, when separating the two disc parts from each other, thus when removing the clutch by drawing along the second disc part of the divided flywheel, be removed with the clutch-side disc part in order to carry out any required exchange of the slide bearing bush on the clutch module intended for overhauling, or in the case of very wear-resistant bushes to leave these on the primary disc part in order to restrict the number of parts and the weight of the module which is to be overhauled, whereby the bush can be hung or connected secured against loss on the desired disc part, for example through a self-locking device, through connection by means of tabs provided on a disc or bush part connecting with the other component part, by press or shrink fit and/or similar.

According to a further inventive idea the clutch module which can be removed from the device is designed so that a simple separation of the disc part holding the contact pressure plate from the clutch cover is possible, for example by means of a separable connection in the area of the outer circumference of the clutch module in order to allow a quick and easy exchange of the clutch disc which is to be repaired or replaced. For this purpose in one advantageous design the disc part and the clutch cover can be provided with axially aligned sleeve-like attachments which face each other and which axially overlap one another wherein the clutch cover can radially overlap the disc part or the disc part can radially overlap the clutch cover. The axially interfitting attachments are centred on each other and are connected together fixed both axially and circumferentially wherein a free rotating end of one attachment can be welded for example to the other attachment and in the event of maintenance this welded seam or welded points can be separated so that the two parts can be separated.

Another type of separable connection can be for example a separable self-locking connection which fixedly connects the two shoulders axially and circumferentially. One advantageous embodiment can hereby be an undercut section which is provided on one of the two shoulders and which after overcoming the proposed axial overlap of the two shoulders snap fits in the other shoulder. By way of example a restriction can be provided on the inner circumference on the shoulder which fits radially over the second shoulder so that this restriction snap fits into a restriction on the outer circumference of the other shoulder after overcoming an axial overlap for centring the two shoulders. This type of connection can be arranged on the same principle also on the outer circumference of the radially inside shoulder wherein the radius of the shoulder widens out at the free end and after overcoming the overlap is snap-fitted into the inner circumference of the radially outer shoulder which is widened out radially for this purpose.

Separating this closure is by means of a pull-off device or by means of levers which engage through openings provided in the circumference of the two shoulders wherein these openings align in the circumferential direction and axially intersect for applying a lever which is inserted from radially outside through the openings. It is obvious that this lever can also be a part of a pull-off device wherein several levers corresponding for example to the number of the openings can be combined into one pull-off device.

A further advantageous design proposes the use of circumferentially spread out snap-fitting noses set in one shoulder to snap fit in openings spread out correspondingly over the circumference of the other shoulder wherein also here an axial overlap of the two shoulders can be advantageous and the connection can be released through leverage tools in a similar manner to that described above.

For a clutch module which can be replaced as a complete unit it can extremely advantageous according to the invention to design the clutch module so that the clutch can be installed in the torque transmission device or can be replaced in the event of maintenance, whilst set complete, that is with the suitable positioning—operating point—of the contact pressure plate, clutch cover and pressure plate relative to each other. For this purpose it can be advantageous to make the clutch axially adjustable during the manufacturing process.

For this purpose one design of the invention can provide one or more circumferentially spread out axially deformable stops, for example axially aligned noses shaped round circumferentially at their free end, on the clutch-side disc part or on the clutch cover, for example on one of the two axial shoulders which are brought to adjoin the other component part. In order to adjust the clutch the axial stops are deformed axially until reaching the operating point and the clutch cover is connected rotationally secured and axially fixed to the disc part, for example in the region of the two axial shoulders, for example by welding, staking or by a self-locking device of the type described above. The axially acting force for deforming he stops can thereby be set in dependence on the operating force of the plate spring so that the operating point can be set for example in dependence on the path of the operating force of the clutch.

A further embodiment can provide a thread or bayonet type connection of the two parts—clutch cover and clutch-side disc part—wherein the adjustment of the operating point of the clutch is set by means of an axial path during rotation of the two parts and on reaching the operating point the rotation is stopped and the two parts are secured against further rotation for example by means of a detent mechanism, welding or securing screws.

In a further advantageous embodiment a self-adjusting clutch, such as is known for example from applications DE OS 42 39 291, DE OS 43 06 505 and DE OS 43 22 677, can be integrated into the prefabricated clutch module so that the service or maintenance intervals can be extended.

According to the idea according to the invention a method can also be provided for assembly and or maintenance which particularly in conjunction with the torque transmission device according to the invention can have great advantages over the prior art.

The following method steps and combinations thereof have proved particularly advantageous:

the clutch, at least consisting of at least one disc part, a contact pressure plate, a pressure plate, and a clutch disc, is prefitted as a complete unit;

the at least one disc part is mounted complete on the crankshaft;

in the event of maintenance a part, at least a part of the clutch consisting of a part holding the contact pressure plate, the pressure plate, the clutch cover and a clutch disc is separated from at least one disc part, which is connected to the crankshaft, at a separable self-locking device accessible from the clutch side;

the removed part of the clutch is serviced;

the removed part of the clutch is after servicing connected to the disc part connected to the crankshaft by means of the self locking device.

The method according to the invention can thereby contain a method step which proposes that a dismantled clutch module is not serviced before, but that it can be advantageous to service or replace the part in a workshop set up for this purpose and to fit a corresponding replacement part new on the disc part. A complete compatibility of the clutch unit for this method of procedure can therefore be particularly advantageous.

To renovate the replaced clutch modules it can be advantageous to separate the clutch module on its outer circumference so that the clutch disc is accessible or can be replaced, for example by separating the disc part holding the contact pressure plate from the clutch cover, whereby it can be particularly advantageous to open a separable self-locking device provided at this point by means of a suitable tool. At the end of the maintenance work the connection can be closed again at this point whereby according to an idea of the invention the closure of the clutch module is such that the clutch is reset to its operating point and then the connection is fixed axially and circumferentially.

It is evident that the method also relates to a torque transmission device in the form of a divided flywheel or twin-mass flywheel whose disc part holding the clutch is set indirectly on the crankshaft for rotation to a restricted angular extent on a disc part on the drive side against the action of a damping device wherein the second disc parts can each have a flywheel mass. It can hereby be advantageous to leave the drive-side disc part on the crankshaft in the separation step of the method and to separate the torque transmission device between the first and second disc part. In a few cases it can however also be possible to leave the two disc parts with the damping device on the crankshaft and to separate the clutch module without the disc part.

In the method step where the clutch module is separated from the disc part on the drive side a further method step can involve the servicing of the slide bearing bush which is provided on the bearing of the two disc parts, whereby the slide bearing bush can advantageously be exchanged with the clutch module and can be replaced where necessary. Furthermore in special cases it can be advantageous to leave the slide bearing bush on the drive-side disc part and to replace it in an additional method step when required.

Furthermore it can be advantageous, particularly when producing compatible clutch modules as replacement modules, to provide a method step where the operating point of the clutch is set during the assembly of the clutch cover and disc part on the clutch side, after which the two component parts are fixed axially and circumferentially, for example through welding, staking, an automatic locking device or the like.

The invention will now be explained in further detail with reference to FIGS. 1 to 12 in which.

Figure 1:
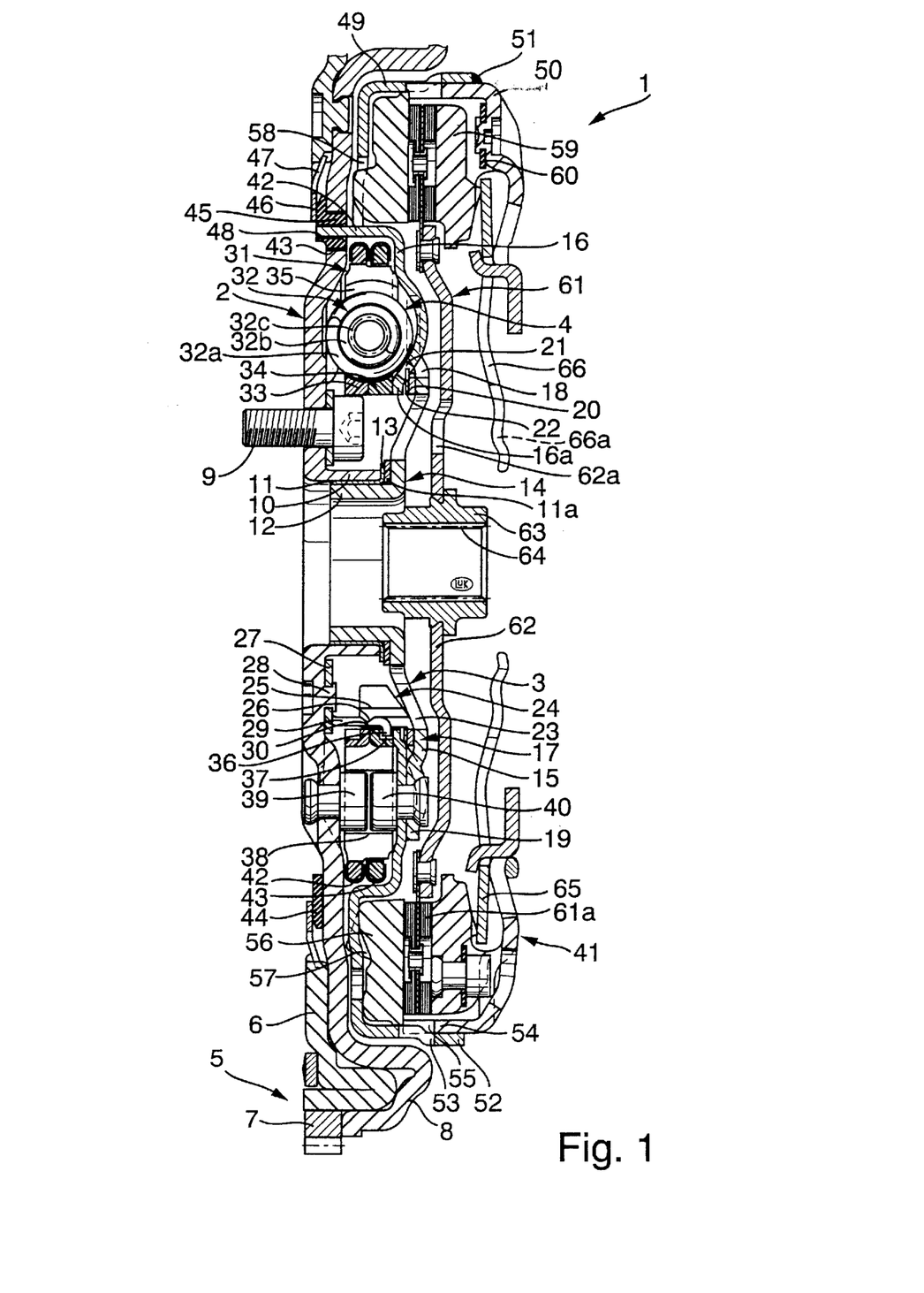
FIG. 1 is a longitudinal sectional view through an embodiment of a torque transmission device according to the invention.

The embodiment illustrated in FIG. 1 of a torque transmission device as a divided flywheel 1 has two disc parts 2, 3 rotatable relative to each other over a restricted torsion angle against the action of the damping device 4 wherein the disc part 2 on the drive side is connected fixed to the crankshaft (not shown in further detail) of an internal combustion engine by means of screws 9.

The disc part 2 on the drive side has in the region of its outer circumference a flywheel mass 5 which in the illustrated embodiment comprises a folded sheet metal part 6 and a double-folded shoulder 8 of the disc part 2 wherein the folded sheet metal part 6 is connected radially on the inside to the disc part 2 by means of axially imprinted circumferentially spaced out rivet dimples 10 and is inserted axially in the moulding 8 of the disc part 2 and a starting gear ring is mounted rotationally secured on the outer circumference of the folded sheet metal part 6 and the axial shoulder 8 of the disc part 2 forms an axial stop for this. It is evident that a design of the flywheel masses in any other way is possible, the disc part 3 itself with suitably shaped mouldings 8 can hold the starting gear ring 7 which can be welded, staked and/or shrink-fitted onto the part holding same and where applicable can be provided through profiling with the component part housing same to transmit increased torque in the circumferential direction.

An axial shoulder 10 can be provided on the disc part 2 on its inner circumference facing the disc part 3 and holding on its inner circumference with the interposition of the slide bearing bush 11 the disc part 3 for forming a bearing 14 which to this end has an axial shoulder 12 facing the disc part 2. The slider bearing bush 11 has in the region of an axial stop of the two shoulders 10, 12 a radially ring-shaped expansion 13 which forms for the shoulder 10 and for the shoulder 12—with the interposition of a disc 11a—an axial stop wherein during relative rotation of the two disc parts 2, 3 a basic friction can be formed between the disc 15 and the radial shoulder 13 of the slide bearing bush 11 parallel to the damping device 4, with the friction torque depending on the axial tension of the two disc parts 2,3 relative to each other. The arrangement of the disc parts 2, 3 can also be such that the disc part 2 on the drive side holds the disc part 3 on the clutch side round the outer circumference with the interposition of the slide bearing bush 11. Furthermore the slide bearing 14 can be replaced by a rolling bearing or another bearing with less friction, more particularly if a friction proportion through the bearing 14 is not desired.

The disc part 3 is in the illustrated embodiment designed in two parts and comprises a radially inner part 15 forming the bearing 14 and a radially outer part 16. The two parts 15, 16 of the disc part 3 engage axially in each other and thereby form mutual stops 18, 19 which prevent relative rotation of the two parts 15, 16. A friction disc 20 is provided axially between an area 16a set on the inner circumference of the disc part 16, and the disc part 15 and in the illustrated embodiment produces a friction action with the disc part 15 in the area 16a and against the action of an axially acting energy accumulator—here a plate spring 22 hung in the openings 21 of the disc part 16 and supported on same. The friction disc 20 is controlled by the primary disc part through the separable connection 24 to produce basic friction.

Radially between the friction clutch 17 and the bearing 14 there are openings in the disc part 3 corresponding to the position of the screws 9 in the circumferential direction for passing through assembly tools through which the device 1 can be fitted on the crankshaft in a completed state.

In order to form the separable connection between the two disc parts 2, 3 as a separable self-locking device 24 the friction ring 20 has radially inside axially extending extension arms 25 spread out over the circumference and arranged as circumferential segments in the circumferential direction between the openings 23 and provided in the area of their axial free end on the outer circumference with tongues 26 which taper radially pointed towards the outside.

On the disc part 2 on the drive side a ring 27 is set on the disc part 2 in the region of the screws secured against loss—in the illustrated embodiment by means of rivet dimples provided on the disc part 2, to form a washer disc or ring for the screws 9 and has in addition axial extension arms 29 with an indentation corresponding in position to the extension arms 25.

The separable self-locking device 24 is locked by the tongues or snap-fitting noses 26 engaging in the indentations 30 wherein an axial and rotationally fixed connection is produced between the two disc parts 2,3.

The friction disc 20 is entrained through the rotationally secured connection during relative rotations of the two discs parts by the snap-fit connection 24 and generates a friction moment on the disc part 15 for a basic friction of the device. The friction disc 20 with the shoulders 25 for forming the separable connection 24 is preferably made from plastics and for example by the injection casting process for the purpose of improving the friction properties.

The damping device 4 is formed next to the friction elements by the mounting device 31 for mounting the circumferentially acting energy accumulators—here in the form of boxed in coil compression springs 32 with an outer spring 32a, a spring 32b mounted radially inside the latter and with a spring 32c mounted radially inside the two springs 32a, 32b, and is described in further detail in the application DE 198 43 298. The mounting device such as a cage 31 consists of two similar types of side parts 33, 34 which are combined to form one unit and which bias the coil compression springs 32 in the circumferential direction wherein each one end of the springs 32 is biased by biasing devices 35 of one of the side parts 33, 34 and the corresponding other end is biased by the biasing devices of the other disc part. The rivet bolts 39, 40 thereby bias the side parts 33, 34 alternately in dependence on the drive and coasting direction during a relative rotation of the two disc parts.

The contact bearing faces 35, 38 of each of the disc parts 33, 34 for the rivet bolts 39, 40 and the energy accumulators 32 thereby engage over the others axially so that these contact bearing faces are formed in the entire axial width of the spring cage 31 and therefore form a full bearing surface for the rivet bolts 39, 40 and for the energy accumulators 32, with these contact bearing surfaces being supported in the circumferential direction correspondingly against the solid parts of the side parts 33, 34 for taking up the circumferential forces. The arrangement of the rivet bolts 39, 40 is thereby made so that during relative rotation of the two disc parts 2, 3 in the drive direction the rivet 39 biases the side part 33 and in the coasting direction the side part 34 so that in the drive direction in the event of a greater force strain the smaller lever is biased between the solid parts of the side part 33 and the rivet bolts 39 and in the coasting direction the part of the side part 33 axially overlapping the side part 34 is biased. The same applies accordingly for the interaction of the side parts 33, 34 with the rivet bolts 40.

In this way a spring cage 31 ready made with the springs 32 is formed as a complete structural unit which can be fitted on one of the two disc parts 2, 3 and which in the event of separation of the two disc parts 2, 3 for maintenance purposes is fixed on one of the two disc parts 2, 3—as here through tongues 36 of the ring 27 which engage radially over the inner circumference and engage with keyed connection in corresponding recesses 37 of the spring cage 31. It is evident that the spring cage 31 can also be fixed in a corresponding way on the disc part 3 in order to be able to remove this with the disc part 2 for maintenance purposes and where applicable for overhauling or replacement.

The two side parts 33, 34 each have circumferentially spread out openings 38 preferably arranged radially level with the springs 32 and in the circumferential direction between the ends of same, into which openings axially aligned rivet bolts 39, 40 of the disc parts engage wherein the rivet bolts 39, 40 each entrain the side part 33, 34 facing same during rotation of the disc parts 2, 3 relative to each other to thus compress the springs 32 through the biasing devices 35. The rivet bolts 40 serve at the same time to rivet the two disc parts 15, 16 of the disc part 3.

The spring cage 31 is in a preferred embodiment made from an injection moulded plastics part and has on its outer circumference as inter alia a safeguard against bursting and/or as protection against the effects of heat radiating from the clutch 41, reinforcements 42, 43, preferably of metal and engaging round each of the side parts 33, 34.

Radially outside of the spring cage 31, the disc part 16 of the disc part 3 on the clutch side has extension arms 42 aligned axially in the direction of the disc part 2 and spread out round the circumference and which pass through oblong holes 43 recessed in the circumferential direction out from the disc part 2 corresponding in their extension in the circumferential direction at least to the maximum torsion angle of the two disc parts 2, 3 relative to each other. A friction control disc 44 engages by axial studs 45 in the openings and is tensioned by means of an axially active energy accumulator—here a plate spring 46—placed against the friction control disc 45 from outside, wherein the friction control disc an also be formed from individual circumferentially spread out friction segments. The energy accumulator is supported on a radial projection of the folded sheet metal part 6 in which it is placed with an external spline 47. The friction control disc 44 thereby develops a friction action on the disc part 2. How this friction moment is controlled depends on the design of the openings 48 through which the extension arms of the disc part 3 engage. If these openings 48 are formed as oblong holes then a torsion play is produced so that the friction can be retarded.

In a further path of the disc part 16 radially outwards an axial shoulder 49 is formed on this to hold the clutch 41 radially inside. To form a clutch module 41 which can be removed complete from the disc part 2 the disc part 3 on the clutch side is connected to the component parts 15, 16 through the axial shoulder 49 with the clutch cover 50 which engages substantially radially round the clutch component parts on the side remote from the disc part 3, fixed in the axial and in the circumferential direction, but separable, such as for example with a welded seam or welding spots 51.

The axial shoulder 49 has at its free end an axial extension 52 wherein openings 53 are provided between the two radii of the shoulder 49 spread out round the circumference. The axially aligned shoulder 54 of the clutch cover 50 has corresponding circumferentially spread out axially aligned extension arms 55 with which the clutch cover engages in the openings 53 of the shoulder 49 and forms an axial stop for the contact pressure plate 56. The clutch cover 50 is centred on the inner circumference of the radially expanded area 52 of the axial shoulder 52. The contact pressure plate is placed on the side remote from the clutch cover on the disc part 16 and is fixed in the circumferential direction by means of circumferentially spread out cams 57 which are formed axially on the contact pressure plate 56 and which engage with keyed engagement in corresponding openings 58 of the disc part 16.

The pressure plate 59 is axially displaceable on the clutch cover 50 in the region of its outer circumference and is connected in the circumferential direction rotationally secured by means of leaf springs 60 which are fixed for example riveted in the circumferential direction at staggered points on the pressure plate 59 and on the clutch cover 50. The plate spring 65 which has openings 66a for passing through assembly tools, tensions the clutch disc 61 which is mounted axially between the contact pressure plate 56 and pressure plate 59, or the friction linings 61a thereof, and is supported in known way on the clutch cover 50. The plate spring 65 can be relaxed through the plate spring tongues 66 by a release device so that the clutch 41 can thereby be disengaged.

The clutch disc 61 which can be brought by means of the friction linings 61 into friction engagement with the contact pressure plate 61 and the pressure plate 59 transfers the torque of the internal combustion engine entered from the crankshaft in the engaged state of the clutch 41 through the flange 62 which is connected rotationally secured to the hub 63 and likewise has openings 62 for assembly purposes, to the gear input shaft (not shown) which is connected rotationally locked to the spline 64 of the hub 63.

Figure 2:
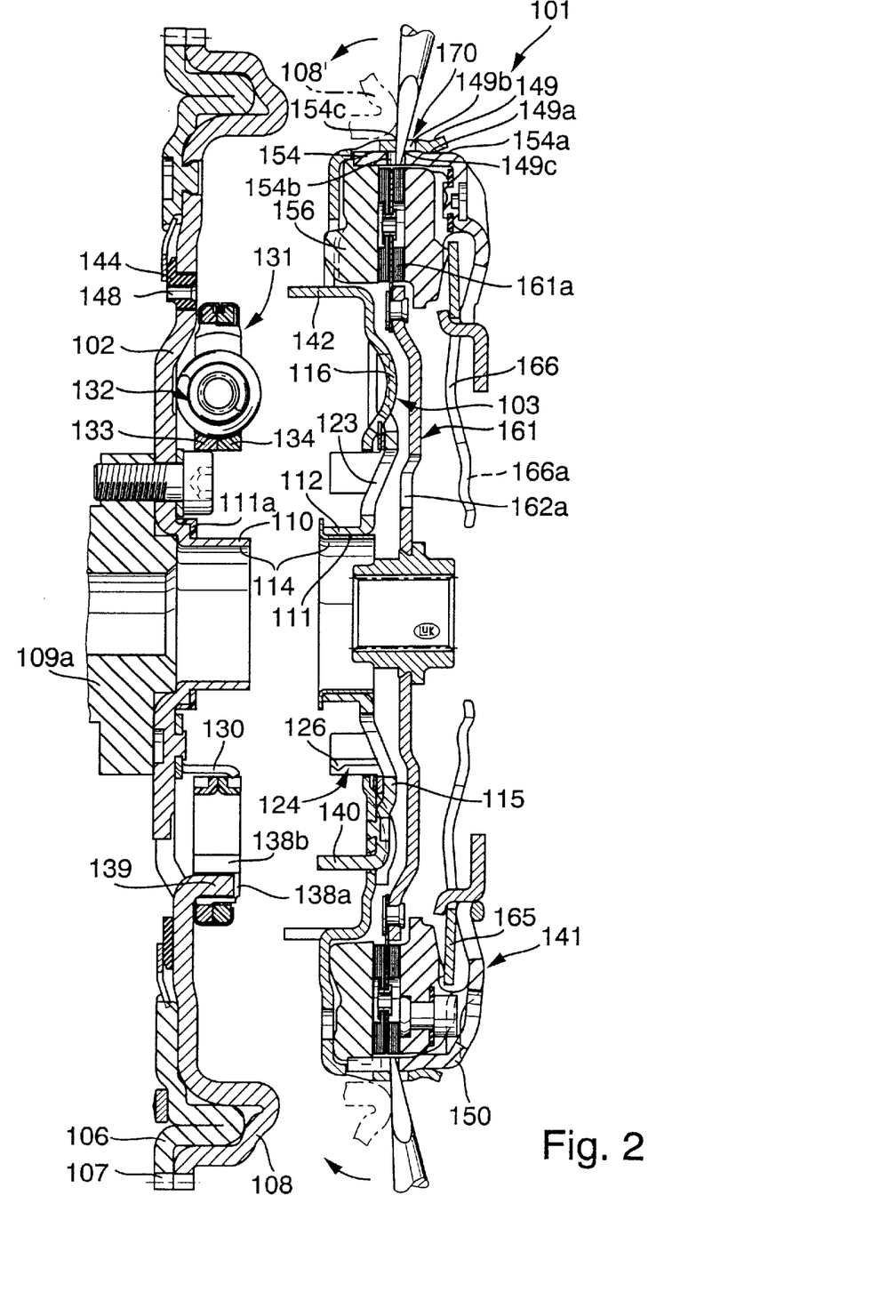
FIG. 2 is a longitudinal sectional view of an embodiment of a device for transmitting torque in the maintenance state.

FIG. 2 shows an embodiment of a torque transmission device according to the invention as a flywheel 101 which is substantially identical to the divided flywheel 1 of FIG. 1, in the maintenance state.

In the illustrated embodiment, differing from the divided flywheel 1 in the FIG. 1, the disc part 103 on the clutch side is on the disc part 102 on the drive side. The bearing of the disc part 103 is provided by means of an axially shaped shoulder 112 on the outer circumference of a shoulder 110 axially imprinted on the disc part 102 wherein the slide bearing bush 111 is fixed on the removable disc part 103 and therefore after removing the clutch module 141 can be easily replaced or can be provided as a new part in an overhauled or new clutch module 141. The slide bearing bush 111 is during fitting of the clutch module 141 brought to bear axially on a stop ring 111a of right-angled cross-section which with relative rotation of the two disc parts 102, 103 can generate a friction moment by means of friction engagement with the slide bearing bush 111 and thereby can provide a constituent part of the basic friction. Radially outside the bearing of the disc part 103 is adjoined by the bearing of the disc part 102 on a shoulder of the crankshaft 109a.

A further difference from the divided flywheel 1 in FIG. 1 is the type of biasing of the spring cage 131 through the disc parts 102, 103. To this end the spring cage 131 has radially overlapping openings 138a, 138b wherein axially formed circumferentially spread out extension arms 139 are provided in the disc part 102 to engage through the openings 138a and circumferentially spread out extension arms 140 set up axially in the disc part 103 consisting of a radially outer disc part 116 and a radially inner disc part 115 engage through the openings 138b wherein the spring cage 131 is formed so that one side part 134 is each time biased by one disc part and each one end of the energy accumulator 132 is biased by a side part 133,134.

The divided flywheel 101 furthermore has no separate starting gear ring. The spline 107 is formed directly from a radial moulding 108 of the disc part 102 and of the folded sheet metal part 106 serving as the flywheel mass, with the parts placed radially against one another and the spline being hardened.

Furthermore the separable connection between the axial shoulders 149, 154 of the disc part 116 and of the clutch cover 150 is formed as a self-locking device 170. To this end the axial shoulder 149 has an undercut section 149a which after centring by sliding the axial shoulders 149, 154 over one another snaps into a restriction in the cover 150. Circumferentially aligned openings 149b, 154b are provided in the axial shoulders 154, 149 and are axially off-set from each other so that the openings partially overlap one another wherein the radially inner openings 154b are moved in the direction of the pressure plate 156. Level tools—such as for example a screw driver 171—can be placed at these openings and for dismantling the clutch module 141 are set up against the edge 154c and release the clutch cover 150 from the snap connection 170 through leverage action in the direction of the arrow at the edge 149c. It is evident that the illustrated lever tool 171 can be replaced by advantageous lever tools appropriate for the pull-off process and which in particular engage in several openings 149b, 154b at the same time.

It can be advantageous to dismantle the clutch module 141 in the state still fitted on the disc part 102. In this case the lever tool 171 can be supported on the axial moulding 108' of the disc part 103. Advantageously however the clutch module 141 is dismantled from the disc part 103 with a subsequent dismantling of the clutch module 141 by opening the snap connection 170. Then the clutch disc 161 having worn-out friction linings 161a can be replaced for example, and the clutch module 141 can be snap-fitted in place again.

In order to dismantle the clutch module 141 from the disc part 3 the snap-fitting connection 124 is opened and the bearing 114 of the two disc parts 102, 103 on each other is separated. The exposed tongues 139, 140—or in the case of the device 1 in FIG. 1, the rivet bolts 39, 40—are drawn out of the spring cage 131 or 31 and the axially aligned extension arms 142 are drawn out of the openings 148 of the friction control disc 144.

The opening of the snap-fitting closure is thereby through lifting the snap-fitting noses 126—which preferably takes place at the same time through corresponding tools—radially outwards in conjunction with an axial displacement of the clutch module 141 so that the snap-fitting noses are disengaged from the openings 130. To this end it can be advantageous to provide a release torque for the snap-fitting noses 126 from the openings 130 and to pull off the clutch module with a pull-off device on the disc part 102 or on the housing of the internal combustion engine and on the disc part 3 for example by hanging the pull-off claws in the openings 123. Access for the tools for dismantling the clutch module 141 is from the gearbox side through openings 123, 162a, 166a in the disc part 102, in the clutch disc 161 and in the plate spring tongues 166 of the plate spring 165.

After maintenance the clutch module 141 or a spare or replacement part is again centred on the disc part 102 on the bearing 124 and the snap-fitting connection 125 is snap-fitted by applying axial force to the clutch module 141.

Figure 3:
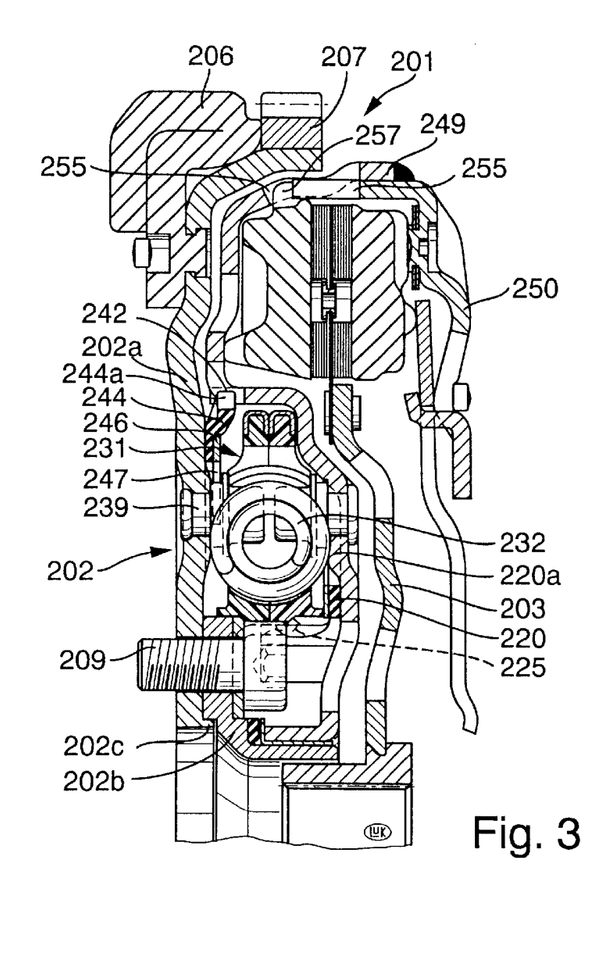
FIG. 3 shows a partial sectional view of a further embodiment of a torque transmission device according to the invention.
Figure 4:
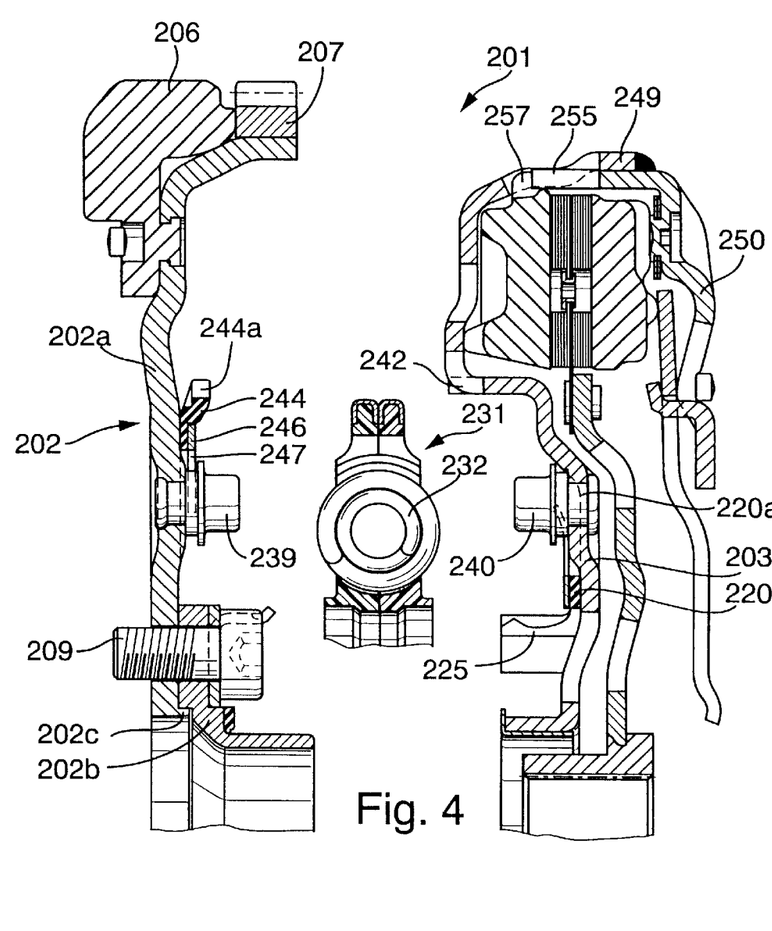
FIG. 4 shows the partially dismantled torque transmission device of FIG. 3.

FIGS. 3 and 4 show a further embodiment of a divided flywheel 201 in the installed and separated state as partial sections.

Compared with the embodiments of FIGS. 1 and 2 the divided flywheel 201 is fitted with an internal friction control disc 244, that is one mounted axially between the two disc parts 202, 203. The friction engagement takes place radially outside of the spring cage 231, wherein the friction control disc 244 is supported axially with an axially acting spring 246 which is hung by means of an internal profile 247 from the rivet bolts 239 for biasing the energy accumulator 232 on the drive side, and is supported on same. On the outer circumference of the friction control disc 244 is an external spline 244a in which axially formed tongues 242 of the disc part 203 engage which is designed in one piece and generate friction engagement during relative rotation of the two disc parts 202, 203 wherein a torsional play can move the introduction of the friction action about an angle corresponding to the torsional play.

The disc part 202 is divided into a radially outer flange 202a and a bearing flange 202b which together are mounted by means of screws 209 on the crankshaft wherein the bearing flange 202b is centred on the flange part 202a by means of an axially protruding shoulder 202c which is provided on the inner circumference of the flange 202a.

The starting gearing ring 207 is mounted on the flange part 202a on which is formed an axially aligned shoulder 208 which supports the starting gear ring 207 on its outer circumference. The folded sheet metal part 206 forms in this embodiment an axial stop for the starting gear ring 207.

The mounting of the friction ring 220 which has the clutch-side mounting 225 of the self-locking unit 224 is changed in respect of the embodiment 1, 101 shown in FIGS. 1 and 2 through the one-piece design of the disc part 203. The ring 220 is thereby mounted with a rotationally secured outer profile 220 in the rivet bolts 240 of the clutch-side biasing devices of the spring cage 231 and is tensioned by means of the axially acting spring 22 which is likewise suspended with an outer profile in the rivet bolts 240 and is supported thereon.

Mounting the contact pressure plate 256 is carried out by providing circumferentially spread out cams 257 round the outer circumference of the contact pressure plate 256 which engage with keyed connection in the openings 255 of the disc part 203 so that a rotationally secured mounting of the contact pressure plate is produced radially inside the disc part with the shoulder 249 axially formed on the outer circumference. At the same time the cams 257 form an axial stop for the axial extension arms 255 of the clutch cover 250 wherein the contact pressure plate is supported axially on the inside of the disc part 203.

FIG. 4 shows the separated unit 201 with a free spring cage 231 which can be mounted on both disc parts. In the illustrated embodiment the drive-side extension arms 229 are provided for holding the spring cage 231 which can be snap-fitted therein and which at the same time is readily accessible where necessary for exchange after the two parts 202, 241 have been separated.

Figure 5:
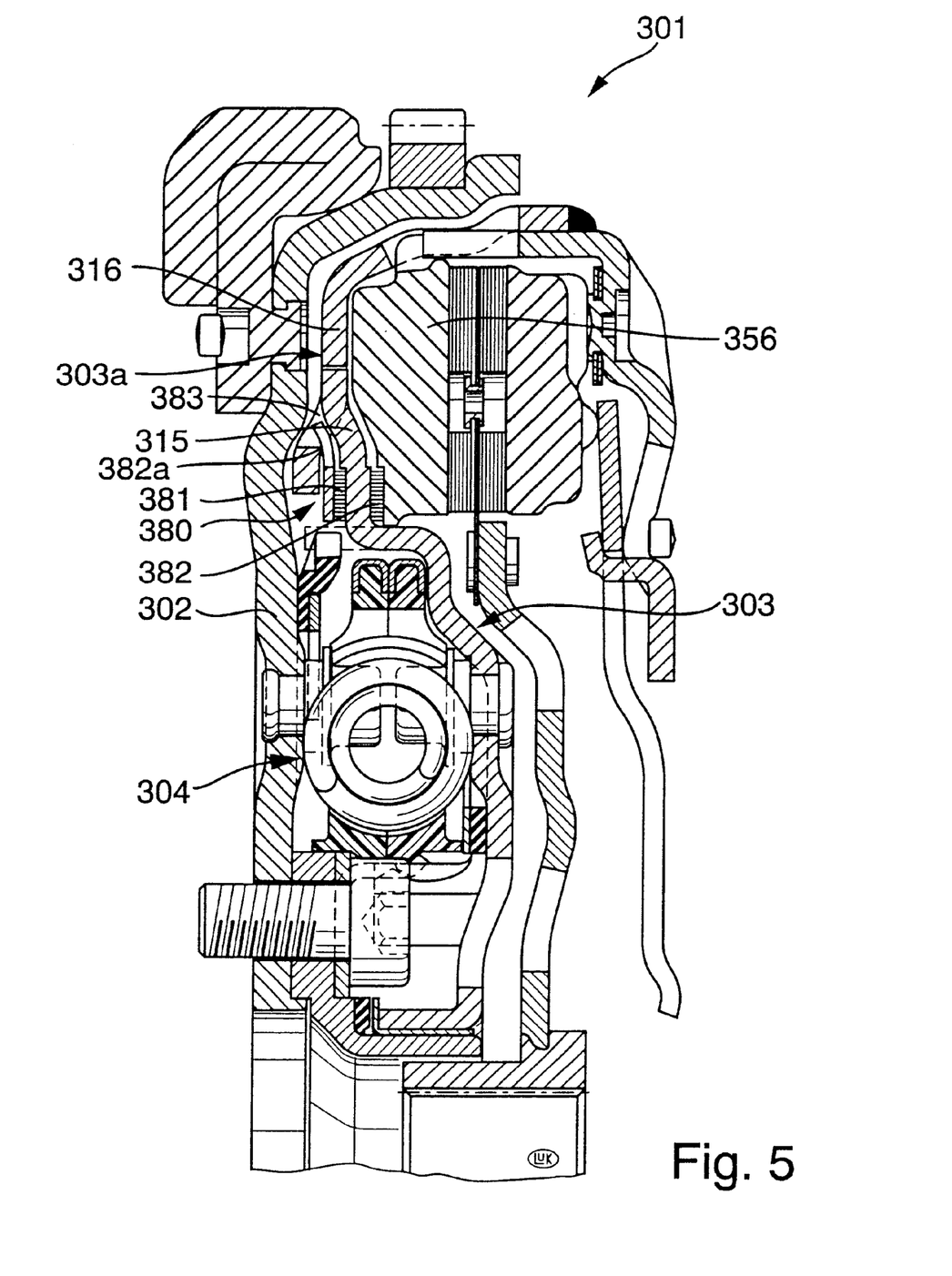
FIGS. 5 and 6 show further embodiments in partial section of the torque transmission devices according to the invention.

FIG. 5 shows a modification of the torque transmission device 201 of FIGS. 3 and 4 as a divided flywheel 301 with a friction clutch 380.

For this the disc part 303 on the clutch side is separated into a radially outer part 316 and a radially inner part 315. In the region of a radial overlap of the two parts 315, 316 the radially inner disc part has an external spline which engages with torsional play of for example less than ±30°, preferably ±15° in openings 383 of the disc part wherein the discs are rotatable relative to each other against the action of the friction clutch 380. The disc part 313 is in order to form the friction engagement of the friction clutch 380 tensioned by means of the friction linings 381, 382 against the contact pressure plate 356 which is connected rotationally secured to the disc part 316, and by means of an axially acting energy accumulator 382 which is hung by means of an external profile 282a in the openings 383 and is supported axially on the disc part 316. The torque transferred by the friction clutch 380 between the two disc parts 315, 316 is greater than the torque of the internal combustion engine transferred from the engine through the disc part 302 and the damping device and which is required for operating the vehicle, but is however less than the torque peaks which can appear particularly during the starting-up phase of the internal combustion engine and preferably in the case of diesel engines so that in these cases the friction torque of the friction clutch 380 is overcome and a slight energy-absorbing rotation of the two disc parts 315, 316 can take place in order to prevent damage to the drive train and/or a loss of comfort through the transmission of these torque peaks to the motor vehicle. The friction clutch 380 stops after using up the torsion angle predetermined by the two disc parts 315, 316 so that in the extremely rare cases where there is a defect in the friction clutch 380 the vehicle can be moved on whilst accepting any possible loss of comfort through the stopping of the two disc parts 315, 316.

Figure 6:
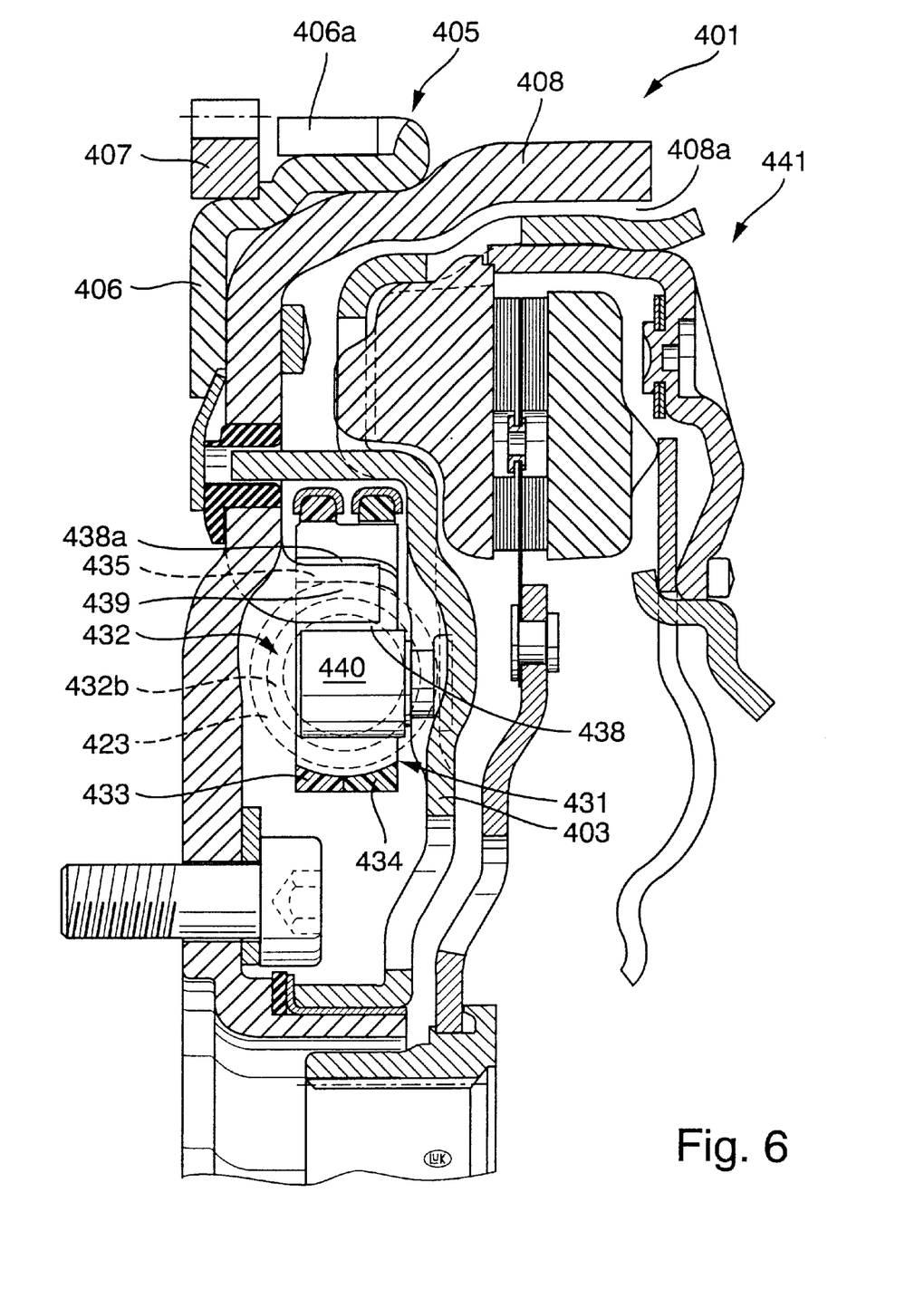

FIG. 6 shows a partial sectional view of a torque transmission device 401 with a different type of biasing of the energy accumulators 432 compared to the embodiments previously described, with the energy accumulators here formed from coil compression springs 432a, 432b which are spread out round the circumference and are boxed in each other. The biasing devices on the drive side for the side part 433 of the spring cage 431 are formed corresponding to the embodiment 201 in FIG. 2 as axially aligned tongues or extension arms 439 which engage in circumferentially spread out openings 438a and which during relative rotations of the disc part 402 opposite the disc part 403 bias the side part 433 and thus the side part 433 whereby the side part 433 compresses the energy accumulators 432 by means of the biasing devices or axial contact bearing faces 435 since they are counteracted at their other end by correspondingly designed contact bearing faces of the side part 434 wherein this side part 434 is biased by rivet bolts 440 which project axially into the spring cage and which are mounted fixed and spread out over the circumference on the disc part 403. The two side parts 433, 434 are thus biased axially over their entire width by the axial extension arms 439, 440 of the disc parts 402, 403 so that a more even force distribution is achieved over the contact bearing faces 438, 438a of the side parts 433, 434.

A further difference in the design of a torque transmission unit 401 shown in FIG. 6 is the shape of the flywheel mass 405 of the disc part 402. Here a simple axial shoulder 408 with a suitable material thickness in the region of between 6 and 10 mm is provided without any further folding, with the radial contour of the shoulder 408 roughly matching the radial contour of the outer circumference of the clutch 441 whilst maintaining a gap 408a for ventilating and cooling the unit 401.

The folded sheet metal part 406 matches the outer circumference of the disc part 402 and forms at its free end on the outer circumferential side markings for the engine management system, for example ignition marks 406a. The starting gear ring 407 is mounted radially adjacent.

Figure 7:
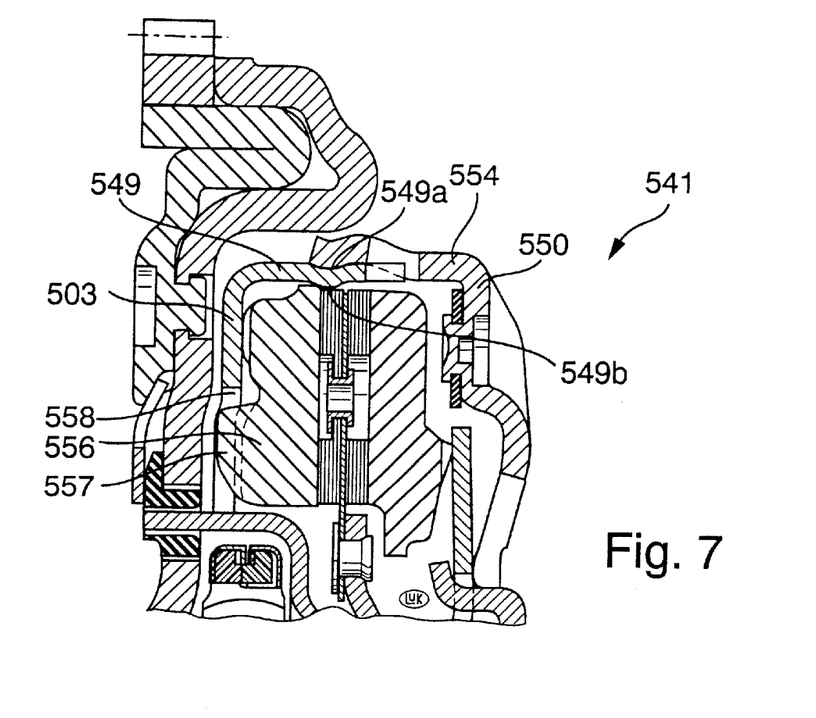
FIG. 7 shows an embodiment of a clutch module in partial section.

FIG. 7 shows a partial sectional view of a clutch module 541 wherein the disc part 503 is connected rotationally secured and axially fixed to the clutch cover by means of a self-locking device 570. As opposed to the embodiment described with reference to FIG. 2, the clutch cover 550 is here mounted on the disc part 503 by means of an axial shoulder 554 radially outside on an axial shoulder 549. The shoulders 549, 554 are thereby snap-fitted together by an undercut section in a manner corresponding to the parts 49, 54 of FIG. 2, with in the embodiment illustrated here the shoulder 554 snap-fitting into a restriction 554a provided in the shoulder 549.

The contact pressure plate 556 is axially placed against the disc part and fixedly connected to the disc part 503 in the rotary direction by means of circumferentially spaced out cams 557 which engage with keyed connection in openings 558 recessed out correspondingly from the disc part 503. In order to prevent an axial displacement of the contact pressure plate the contact pressure plate 556 is tensioned axially between the radially aligned part of the disc part 503 and a radial constriction 549b of the restriction 549a radially inside the shoulder 549 serving as the stop for the contact pressure plate, whereby for technical production reasons two assembly sequences can be advantageous, namely positioning the contact pressure plate 556 before applying the restriction 549a or pressing in the contact pressure plate 556 under pretension over the already existing constriction 549b, whereby friction contact without any stop action by the constriction 549b may even be sufficient for axially fixing the contact pressure plate.

Figure 8:
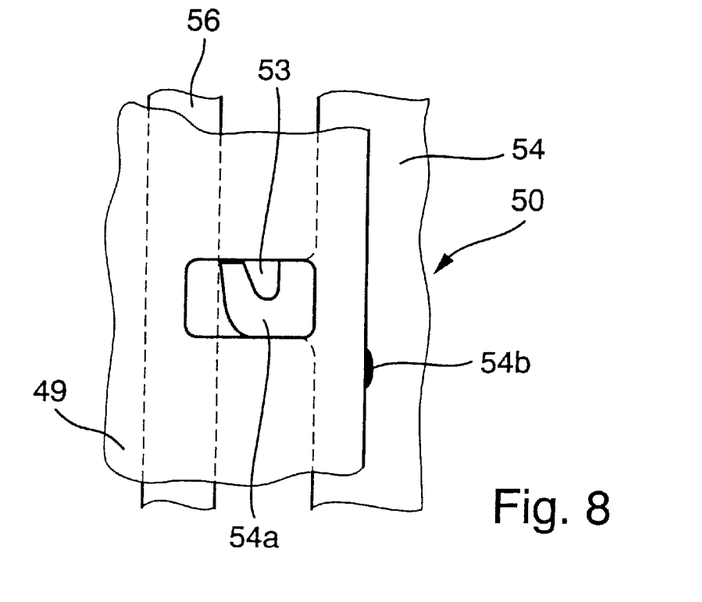
FIG. 8 shows a detail on the setting of the operating point of the clutch module.

FIG. 8 shows a detail of a possible design of a process for adjusting the operating point of a clutch module 41, 141, 241, 341, 441, 541 of FIGS. 1 to 7.

By way of example the clutch module 141 of FIG. 1 is used to explain FIG. 9. Depending on the axial tolerances of the disc part 3 with its axial shoulder 49, the contact pressure plate 56, the clutch 61, the pressure plate 59 and the plate spring 65 of the clutch module 41, the spacing of the contact pressure plate 56, the friction linings 61 and the pressure plate 59 must be adapted so that the plate spring 65 is in the optimum position regarding its characteristic and the positioning of the plate spring tongues 66, that is, the distance between the contact of the contact pressure plate 56 against the disc part 3 and the mounting of the plate spring 65 on the clutch cover 50 must be adjusted so that it is possible to use ready assembled clutch modules 41 adjusted to the operating point—the point at which the plate spring is optimum set.

An advantageous development is the use shown in FIG. 8 of a clutch cover 50 with an axial shoulder 54 which has at its free end circumferentially spread out axially aligned projections 54a pointing in the circumferential direction at the free end. For mounting the clutch module, the contact pressure plate 56 is placed in the disc part 3 with the axial shoulder 49, then the clutch cover is centred radially inside the inner circumference of the axial shoulder 49 of the disc part 49 and the projections 54a are placed against the contact pressure plate 56 so that these projections 54a engage in part through correspondingly arranged openings 53. In order to adjust the module 41 the projections 54a are now with an axially acting force deformed axially in dependence on the position of the plate spring 56 until reaching the operating point. On reaching the operating point the shoulder 49 is connected to the shoulder 54 by means of the welding points 54b or a continuous welded seam.

It is evident that the projections 54a can also be provided on the disc part 3, more particularly on an axial shoulder 49 whereby the clutch cover 50 forms a fixed stop for the contact pressure plate. Furthermore it can also be advantageous in order to allow adjustment of the clutch modules such as 141 of FIG. 2, to provide snap closures with thread-like, or partial thread like such as bayonet-type grooves in which correspondingly raised snap-fitting noses engage wherein these can be turned in the grooves with axial displacement to adjust the operating point whereby a self-locking action can secure the adjustment, such as for example grooves and/or noses having a suitable rough depth, or additional means such as fixing screws and the like.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Device for transmitting torque, more particularly for motor vehicles, with at least one first disc part which is fixed directly or indirectly to a crankshaft of an internal combustion engine, with a friction clutch connected to this disc part and consisting of a contact pressure plate, a clutch cover which houses an axially displaceable pressure plate which is rotationally secured, the clutch cover engages radially around this pressure plate, wherein axially between the contact pressure plate and the pressure plate there is a clutch disc having friction linings provided on the outside and which can be thought into frictional engagement with the pressure plate and contact pressure plate by means of at least one energy accumulator acting axially between the pressure plate and the clutch cover and the clutch disc is connectable rotationally secured to a gear input shaft of a transmission mounted on the output side in the force flow, wherein the device is mounted as one complete unit on the crankshaft, the friction clutch being connected to the disc part by means of fixing means which can be separated from the transmission side, such that the friction clutch can be removed from the disc part as an assembled unit while the disc part remains fastened to the crankshaft, wherein the fixing means are designed as a push-fit connection.

2. The device according to claim 1, wherein the fixing means are self-locking.

3. The device according to claim 1, wherein axially aligned extension arms of the clutch cover axially tension the contact pressure plate with the disc part.

4. The device according to claim 1, wherein the fixing means are designed as an axially locking snap-fit connection.

5. The device according to claim 1, wherein to form the connection at least one axial extension arm provided on the first disc part is locked to an axial extension arm provided on the friction clutch.

6. The device according to claim 5, wherein the axial extension arm of the friction clutch is formed from a second disc part housing the contact pressure plate and fixedly connected on its outer circumference to the clutch cover.

7. The device according to claim 1, wherein the fixing means are provided in a radial area where the device is mounted on the crankshaft.

8. The device according to claim 1, wherein the fixing means are provided at approximately the same radial height as means for fixing the first disc part on the crankshaft.

9. The device according to claim 5, wherein between two and ten axial circumferentially spaced out extension arms of one disc part are connected to the same number of axial extension arms of the other disc part.

10. The device according to claim 5, wherein the axial extension arms of one disc part have snap-fitting noses which click into the complementing openings provided in the axial extension arms of the other disc part.

11. The device according to claim 10, wherein the snap-fitting noses are provided on the extension arms of one disc part.

12. The device according to claim 10, wherein the snap-fitting noses are provided on the extension arms of the disc part on the clutch side.

13. The device according to claim 10, wherein the snap-fitting noses are provided alternately round the circumference on the extension arms of the two disc parts.

14. The device according to claim 10, wherein the snap-fitting noses are aligned radially outwards and click into radially outward, axially directed openings of the complementary extension arms.

15. The device according to claim 1, wherein the fixing means connect the first disc part to the second disc part axially fixed but able to separate and rotate in the circumferential direction.

16. The device according to claim 1, wherein the fixing means are housed on a common ring which is set axially fixed and rotatable on one of the two disc parts and the fixing means thereby form with the other disc part an axially fixed but rotatable connection which can be separated accessible from the transmission side.

17. The device according to claim 1, wherein the ring is housed axially between a disc part and a component part which is connected to the disc part, covers the ring radially and releases the fixing means in the region of the proposed rotation of the two disc parts relative to each other, and under select conditions an axially active energy accumulator tensions the ring between the disc part and the component part radially covering the ring axially, but rotatable after applying a friction torque set by the axially active energy accumulator.

18. The device according to claim 17, wherein the disc part on the drive side is formed axially flexible to suppress bending and/or axial vibrations of the crankshaft.

19. The device according to claim 17, wherein the two disc parts are rotatable circumferentially relative to each other against the action of a damping device with at least one energy accumulator.

20. The device according to claim 19, wherein the at least one energy accumulator is housed in a cage-like component part by means of which the at least one energy accumulator can be biased on the drive side and output side.

21. The device according to claim 19, wherein the energy accumulators can be installed in the device prefitted in the cage-like component part.

22. The device according to claim 20, wherein the cage-like component part is fixed secured against loss on one of the two disc parts.

23. The device according to claim 20, wherein the cage-like component part is connected to the disc part on the drive side.

24. The device according to claim 20, wherein the cage-like component part is suspended from the disc part on the drive side by means of fixing means which are fixed on the screws for fixing the unit on the crankshaft and have tabs which engage axially round the cage-like component part and engage radially in corresponding recesses in the cage-like component part.

25. The device according to claim 5, wherein between three and six axial circumferentially spaced out extension arms of one disc part are connected to the same number of axial extension arms of the other disc part.

26. The device according to claim 19, wherein between 4 and 6 circumferentially arranged energy accumulators are mounted to act between the disc parts.

27. The device according to claim 19, wherein during rotation of the disc parts relative to each other the at least one energy accumulator is compressed at one circumferential side end by the disc part on the clutch side and at the other end by the disc part on the drive side by means of axially aligned extension arms which engage in the cage-like component part having corresponding biasing devices.

28. The device according to claim 19, wherein the at least one energy accumulator is stored with pretension in the cage-like component part.

29. The device according to claim 19, wherein the at least one energy accumulator is a coil compression spring.

30. The device according to claim 29, wherein the coil compression spring is operated without the addition of any lubricants.

31. The device according to claim 27, wherein the extension of the energy accumulator in the circumferential direction compared with the circumference of the energy accumulator assembly is small.

32. The device according to claim 31, wherein the ratio between the extension of the at least one energy accumulator and the circumference is less than 0.5.

33. The device according to claim 19, wherein at least three circumferentially arranged energy accumulators are mounted to act between the disc parts.

34. The device according to claim 17, wherein further energy accumulators having the same or different spring rate are arranged on at least one further radially inner and/or radially outer circumference to act between the two disc parts.

35. The device according to claim 17, wherein a friction device is active in the force flow between the disc parts at least over a part of the rotational travel of the disc parts relative to each other.

36. The device according to claim 35, wherein the friction device consists of a basic friction acting continuously during rotation of the disc parts relative to each other, and of a friction which is controlled in dependence on the torsion angle.

37. The device according to claim 36, wherein the basic friction is produced by means of a friction disc which is tensioned in the region of the bearing of the two disc parts on each other axially between the two disc parts or between one disc part and one bearing bush connected rotationally secured to the other disc part.

38. The device according to claim 37, wherein the axial tension is produced by means of the fixing means between the two disc parts.

39. The device according to claim 35, wherein the basic friction takes place between the ring for holding the fixing means and the disc part holding the fixing means, wherein the ring and disc part are spaced from each other by means of an axially operating energy accumulator.

40. The device according to claim 35, wherein the basic friction takes place by means of two biasing devices of the cage-like component part which are in axial friction engagement for holding the at least one energy accumulator, wherein the biasing devices are tensioned against each other through the connection between the two disc parts which is formed elastic with axial restriction.

41. The device according to claim 36, wherein the controlled friction is produced by means of a friction disc or circumferentially spaced out friction segments which engage(s) by means of keyed connection in one of the disc parts and is in direct or indirect friction engagement with the other disc part.

42. The device according to claim 41, wherein the keyed connection forms backlash for producing a retarded friction.

43. The device according to claim 41, wherein the keyed connection is formed by means of a spline between the friction disc forming friction engagement with the one disc part, and the other disc part.

44. The device according to claim 31, wherein the ratio between the extension of the at least one energy accumulator and the circumference is less than 0.25.

45. The device according to claim 41, wherein the friction disc is mounted on the disc part on the crankshaft side.

46. The device according to claim 41, wherein the friction disc is mounted on the side of a disc part remote from the damping device.

47. The device according to claim 41, wherein the friction disc is hung secured against loss by means of axially aligned studs in circumferentially oblong-shaped openings provided in the disc part.

48. The device according to claim 41, wherein the friction disc is tensioned with the disc part by means of an axially operating energy accumulator.

49. The device according to claim 48, wherein the axially operating energy accumulator is a plate spring which biases the friction disc radially from the outside and which is supported radially on the outside on the disc part or on a component part connected to the latter.

50. The device according to claim 49, wherein the component part which is fixedly connected to the disc part is a folded part of sheet metal for mounting or forming the starting gear ring.

51. The device according to claim 47, wherein openings are provided in the studs through which the axially aligned extension arms of the other disc part or of a component part connected thereto engage with rotational locking, and in the proposed friction angular region predetermined through the extension of the oblong openings in the circumferential direction turn the friction disc relative to the one disc part producing a friction moment.

52. The device according to claim 1, wherein the disc part supporting the friction disc is the disc part on the clutch side.

53. The device according to claim 41, wherein the friction disc is mounted radially outside of the damping device.

54. The device according to claim 1, wherein at least one disc part contains a flywheel mass associated with same.

55. The device according to claim 54, wherein the flywheel mass is shaped from the disc part.

56. The device according to claim 54, wherein the flywheel mass on the drive side is formed by folding sheet metal belonging to the disc part along its outer circumference.

57. The device according to claim 54, wherein a further folded component part for forming the flywheel mass on the drive side is inserted between an axially aligned sheet metal fold of the disc part on the drive side.

58. The device according to claim 1, wherein a starting gear ring is connected fixed to the disc part on the drive side on the outer circumference thereof.

59. The device according to claim 58, wherein the disc part on the drive side radially outside of the sheet metal folds for forming the flywheel mass as well as where applicable the inserted folded component part forms a radially outwardly shaped shoulder and where applicable when using the inserted component part a shoulder with doubled sheet metal thickness which has a circumferential spline in which a pinion of a starter engages with rotational locking.

60. The device according to claim 59, wherein the spline is hardened.

61. The device according to claim 1, wherein at least two adjoining circumferences arranged radially on the outside and belonging to different sheet metal parts have an external spline.

62. The device according to claim 54, wherein the flywheel mass of the disc part on the clutch side is formed substantially by the parts, such as contact pressure plate and/or pressure plate, which form the friction engagement with the clutch disc.

63. The device according to claim 54, wherein a friction clutch is provided at least on one side part between the disc part and the flywheel mass.

64. The device according to claim 63, wherein the friction clutch is restricted in its turning path.

65. The device according to claim 63, wherein the torque which can be transferred through the friction clutch is less than the maximum transferable torque of the internal combustion engine.

66. The device according to claim 63, wherein the friction clutch restricts the transferable torque more particularly during the starting process of the internal combustion engine.

67. The device according to claim 63, wherein the friction clutch is provided on the disc part which is designed in two parts on the clutch side, wherein a flange part forming the bearing for the disc part on the drive side is rotatable with restricted movement opposite a flange part holding the clutch with the interposition of the friction clutch, where necessary by means of axial stops of the first flange part which engage in recesses of the second flange part corresponding to the torsion angle.

68. The device according to claim 54, wherein the disc parts are mounted one on the other.

69. The device according to claim 54, wherein the disc parts are mounted for sliding movement on each other.

70. The device according to claim 54, wherein the disc parts are mounted one on the other with the interposition of a sliding bearing sleeve.

71. The device according to claim 1, wherein the device is mounted on the crankshaft.

72. The device according to claim 1, wherein the bearing of the device on the crankshaft is undertaken by a bearing flange and the two disc parts are mounted on the bearing flange.

73. The device according to claim 72, wherein the bearing flange and the disc part on the drive side are in one piece.

74. The device according to claim 72, wherein the bearing of the device on the crankshaft and the bearing of the disc part on the drive side are provided on different diameters.

75. The device according to claim 72, wherein the disc part on the clutch side is mounted on the bearing flange by means of an internal circumference.

76. The device according to claim 72, wherein the bearing flange holds to the bearing by means of an inner circumference an axially shaped shoulder on the outer circumference of the disc part on the clutch side.

77. The device according to claim 72, wherein the bearing of the disc part on the drive side on the disc part on the clutch side is likewise separated during separation of the two disc parts.

78. The device according to claim 70, wherein the slide bearing bush during separation of the two disc parts remains on one of the two disc parts and for this purpose is connected secured against loss to the corresponding disc part.

79. The device according to claim 70, wherein the slide bearing bush is press-fitted or locked to the disc part or shrink-fitted onto the disc part.

80. The device according to claim 70, wherein the slide bearing bush during separation of the disc part on the drive side and disc part on the clutch side for maintenance purposes remains on the disc part on the clutch side.

81. The device according to claim 1, wherein the disc part on the clutch side is connected radially on the outside to the clutch cover from which it can be separated.

82. The device according to claim 1, wherein the disc part and the clutch cover have axially aligned sleeve-like shoulders facing towards each other, with one set axially overlapping the other.

83. The device according to claim 82, wherein the shoulders are centred on each other and are connected together axially and circumferentially fixed.

84. The device according to claim 82, wherein the shoulders overlap one another and a free circumferential end of the overlapping shoulder is welded to the other shoulder.

85. The device according to claim 82, wherein the shoulders are connected by means of a separable self-locking device.

86. The device according to claim 85, wherein the separable self-locking device is formed by means of an undercut section provided on an axial free end of the first shoulder and axially overlapping the second shoulder.

87. The device according to claim 86, wherein the undercut section is formed on the outer circumference of the overlapped shoulder or on the inner circumference of the overlapping shoulder.

88. The device according to claim 82, wherein openings which overlap one another in part in the axial direction are provided in the circumferences of both shoulders.

89. The device according to claim 1, wherein an operating point of the clutch is axially adjustable.

90. The device according to claim 89, wherein the operating point is adjustable by means of a stop which can be axially changed by means of a force which is to be predetermined.

91. The device according to claim 90, wherein the axial stop is formed from deformable circumferentially spaced out noses which are aligned axially at the free end of the shoulder belonging to the clutch cover.

* * * * *